United States Patent

Beyer et al.

[11] Patent Number: 5,942,642
[45] Date of Patent: Aug. 24, 1999

[54] METHOD FOR MAKING OLIGOMERS

[75] Inventors: Claudia Beyer, Bickenbach; Horst Pennewiss, Darmstadt, both of Germany

[73] Assignee: Roehm GmbH Chemische Fabrik, Darmstadt, Germany

[21] Appl. No.: 08/937,371

[22] Filed: Sep. 25, 1997

Related U.S. Application Data

[63] Continuation of application No. 08/732,829, Oct. 15, 1996, abandoned, which is a continuation of application No. 08/454,961, May 31, 1995, abandoned, which is a continuation of application No. 08/246,934, May 20, 1994, abandoned, which is a continuation of application No. 08/115,460, Sep. 1, 1993, abandoned, which is a continuation of application No. 07/741,135, Aug. 7, 1991, abandoned.

[30] Foreign Application Priority Data

Aug. 11, 1990 [DE] Germany .............................. 40 25 493

[51] Int. Cl.$^6$ ............................ C07C 67/00; C07C 69/52
[52] U.S. Cl. ........................... 560/202; 560/193; 560/198
[58] Field of Search .................................... 560/202, 193, 560/198

[56] References Cited

U.S. PATENT DOCUMENTS

| | | | |
|---|---|---|---|
| 3,968,148 | 7/1976 | Leister et al. | 560/202 |
| 4,009,195 | 2/1977 | Leister et al. | 558/358 |
| 4,419,106 | 12/1983 | Miller | 44/62 |
| 4,526,950 | 7/1985 | Grava | 526/272 |

FOREIGN PATENT DOCUMENTS

| | | |
|---|---|---|
| 0054139 | 6/1982 | European Pat. Off. . |
| 0217602 | 4/1987 | European Pat. Off. . |
| 2243064 | 3/1973 | Germany . |
| 3223694 | 3/1983 | Germany . |

OTHER PUBLICATIONS

Encyclopedia of Polymer Science and Engineering, vol. 4, third edition, edited by J. Brandrup and E. H. Immergut, "Copolymerization" and "Depolymerization", 1989, pp. 223–225 and 719–745.

H. F. Mark et al., Encyclopedia of Polymer Science and Engineering, vol. 4, John Wiley & Sons, NewYork, pp. 223–225.

H. F. Mark et al., Encyclopedia of Polymer Science and Engineering, vol. 4, John Wiley & Sons, New York 1986, title page and frontispiece.

Brandrup and Immergut, Polymer Handbood, 3rd Edition, John Wiley & Sons, New York, 1989, title page and frontispiece.

*Primary Examiner*—Samuel Barts
*Assistant Examiner*—Rosalynd Keys
*Attorney, Agent, or Firm*—Oblon, Spivak, McClelland, Maier & Neustadt, P.C.

[57] ABSTRACT

The invention relates to a method for making oligomers, including homo-oligomers and cooligomers, by the free radical polymerization of at least one monomer component B) having a greater tendency to polymerize and 0–90 wt. %, calculated on the oligomers, of a monomer component A) having a lesser tendency to polymerize, at an elevated temperature and in the presence of a polymerization initiator in a conventional polymerization vessel, by adding monomer component B) to monomer component A), or to a solution of monomer component A), or merely to a solvent, so that the mol ratio of B) to A), if A) is present, passes through values of 0 to about 0.2 during the initial phase of the polymerization and takes the value 0.2 to 20 during the terminal phase of the polymerization, the reaction temperature being in a region in which a homopolymer of the monomer component B) is already significantly depolymerized, and the initiator, which has a half-life time at the reaction temperature from 1 minute to about 5 hours, being added throughout the duration of the polymerization in an amount from 0.1 to 10 percent of the total weight of the monomers.

7 Claims, No Drawings

METHOD FOR MAKING OLIGOMERS

This application is a continuation of U.S. application Ser. No. 08/732,829 filed Oct. 15, 1996 and now abandoned, which is a continuation of U.S. application Ser. No. 08/454,461 filed May 31, 1995 and now abandoned, which is a continuation of U.S. application Ser. No. 08/246,934 filed May 20, 1994 and now abandoned; which is in turn a continuation of U.S. application Ser. No. 08/115,460 filed Sep. 1, 1993 and now abandoned; which is in turn a continuation of U.S. application Ser. No. 07/741,135 filed Aug. 7, 1991 and now abandoned.

FIELD OF THE INVENTION

The present invention relates to a method for making oligomers, including homo- and cooligomers, and particularly cooligomers of (meth)acrylic acid esters and α-olefins, which oligomers are useful as synthetic oils or components of such, as additives to petroleum oil, and as plasticizers.

STATE OF THE ART

Oligomers are generally understood to be compounds having molecular weights from $10^2$ to $10^5$, particularly $10^2$ to $10^4$, which are built up from corresponding monomer units. (Cf. Römpp's Chemie-Lexikon, vol. 8, p. 2893, Franckh'sche Verlagsbuchh. 1985) Exemplary of the standard state of the art for the present invention are cooligomers of (meth)acrylic acid esters and α-olefins. Oligomers of acrylic acid esters in the present sense are described, e.g., in the work of C. E. Rehberg et al. in Ind. Eng. Chem. 44 (12) 2864, (1952).

For example, oligomers of this type composed of three different monomer groups are described in U.S. Pat. No. 3,968,148 or German DE-A 22 43 064. What is claimed are oligomers of:

| | |
|---|---|
| ca. 10–90 wt. % | of a 1-alkene having 4 to 32 C-atoms |
| ca. 1–35 wt. % | of one or more alkyl (meth)acrylic acid esters having 8–34 C-atoms in the alkyl portion and |
| ca. 1–35 wt % | of one or more alkyl esters of (meth)acrylic acid or of homologous, terminally unsaturated carboxylic acids having 1–4 C-atoms in the alkyl portion. |

The molecular weight of this kind of oligomer is preferably $M_n$=1000 to 4000. The narrow molecular weight range achieved and the high uniformity of the products are emphasized.

U.S. Pat. No. 4,009,195 further describes an oligomerization method in which the most different (meth)acrylic acid derivatives, such as C1–C4-alkyl esters in amounts from 1–35 percent by weight with (meth)acrylic acid esters of C8–C34-alkanols in amounts from 1–45 percent by weight are added continuously and simultaneously to a mixture of free radical initiators and 10–90 percent by weight of a 1-alkene having 4–32 C-atoms in such a way that the molar ratio, which essentially is immediately established, of acid derivative to 1-alkene in the reaction batch is held relatively constant in the range from 0.001 to 0.2, the addition taking place at a temperature which does not impair the oligomerization. The yields are given as 40 to 70%, whereby the α-olefin particularly remains.

Further, DE-A 3,223,694 claims copolymers of α,β-unsaturated dicarboxylic acid esters with α-olefins. The α,β-unsaturated dicarboxylic acid esters in this case contain, by definition, linear or branched monoalcohols having 3–10 carbon atoms as the alcohol component; the α-olefins have 10–16 carbon atoms. The copolymers can optionally be crosslinked and their pour point is said to lie between −60° C. and 0° C.

A method of making copolymers is described in U.S. Pat. No. 4,526,950, in which, starting with at least one α-olefin having at least 6 C-atoms and at least one unsaturated carboxylic acid or its derivatives which are copolymerizable with the olefins, the mixture of components is heated to at least 135° C. in the presence of a free radical initiator and in the absence of solvents or diluting agents, whereby none of the reactive monomers is used in excess in order to avoid any dilution effect. Further, SU-A 1,135,752 claims copolymers of decyl methacrylate and tetradecene having a molecular weight of 8000–13000 as a thickener for lubricating oils.

Oil additives comprising ethylene copolymers, inter alia with ethylenically unsaturated mono- or dicarboxylic acids or their esters, having a molecular weight $M_n$ of <1000 are known from EP-A 217,602.

Problem and Solution

A way to lowering molecular weight in the free radical polymerization of monomers is by the use of chain transfer agents, particularly mercaptans. (Cf. G. Henrici-Olivé et al., Fortschr. Hochpolym. Forsch., vol. 2, pp. 496–577, 1961; Houben-Weyl, *Methoden der organischen Chemie*, 4th ed., vol. XIV/I, Georg Thieme Verlag 1961).

Overdosing with catalysts is taught in the literature as a further suitable measure. However, this means higher method costs. Further, there are investigations into the formation of oligomers of methyl methacrylate by heating in the liquid phase above 160° C. in the presence of an inhibitor. Elevated temperature, elevated pressure, and longer reaction times tendentially favor the formation of higher oligomers. (Houben-Weyl, loc.cit., 4th ed., vol. XIV/1, pp. 1046, 1072–1073. On the other hand, a commercial method that relies on free radical polymerization and proceeds exothermically must refrain from overly drastic method conditions. If one looks again for a paradigm in the field of making oligomers or cooligomers of (meth)acrylic acid esters and α-olefins as the state of the art, the lack of generally useful rules for methods which afford a sustained good result is evident. Even in individual cases the described method is not fully satisfactory. The following are characteristic of the state of the art in the preparation of (meth) acrylate oligomers:

The apparatus used, especially for anionic polymerization, is necessarily complicated, since operation is under inert conditions; relatively pure monomers are needed; the use of a solvent is part of the standard methodology.

The use of chain transfer agents (regulators) in free radical reactions leads to notorious problems with the incorporation of regulator end groups, as is known from the mercaptans.

Further, high concentrations of initiator are employed. Apart from the considerable costs, this also means an increased safety risk.

It has now been found that the method of the present invention gives essentially improved access to cooligomers, particularly those of (meth)acrylic acid esters and α-olefins.

The present invention concerns a method by means of which (meth)acrylates can be homopolymerized or, with further monomers, copolymerized, whereby the molecular weight can be controlled over a wide region which covers the entire oligomer region and also extends beyond it. No chain transfer agent is used. The amount of initiator is as a rule also not above the amounts conventional for solution polymerization. Above all, control of the molecular weight toward low molecular weights is not principally by variation in the amount of initiator, as described in the state of the art.

The systems described consist of a component B) having a high tendency toward polymerization [such as (meth) acrylates], as well as a component A) having a low tendency toward polymerization, and/or a suitable solvent.

The regulation of molecular weight follows—even for the low molecular weight oligomers, inclusive of dimers/trimers—from the following influential parameters:

α) The ratio of B) to A), or of B) to A) plus a solvent, or of β) to a solvent alone. Under otherwise similar conditions, one obtains lower molecular weights with a larger amount of A) and/or solvent.

β) The time of feed addition for B), whereby under otherwise similar conditions, lower molecular weights are obtained by lengthening the time of addition.

γ) The reaction temperature, which is so chosen that it lies in a region in which a conventionally prepared homopolymer, free of chain transfer agent, of the better-polymerizing component B) already noticeably depolymerizes. By this is meant that, at the chosen temperature, larger amounts of monomer, as a rule 3–80 percent by weight, particularly 10–60 percent by weight, of monomer are present in the monomer-polymer-equilibrium. Thus, to give an example, the temperature region from 120° C. to 170° C., at which between 3 and 80 wt. % monomer is present at equilibrium, is suitable for n-decyl methacrylate, depending on the molecular weight range strived for. A temperature at which between 15 and 50% of monomers are present (in this case 140° C.–160° C.) is very particularly suitable for molecular weights $\overline{M}_w$ in the low molecular weight region, together with high yields. By means of this effect of the reaction temperature, the formation of long B)-seguences can be more or less checked according to the chosen temperature, which makes possible a very effective control of molecular weight in addition to α) and β). Decreasing the reaction temperature in the region described leads to an increase in (co)oligomer molecular weight.

Determination of the monomer/polymer equilibrium can be carried out as taught by S. Bywater, Trans. Faraday Soc. 51, 1267 (1955). In a somewhat modified version, an approximately 20% solution of a monomer in o-dichlorobenzene is rinsed with nitrogen in a stirred vessel for about 30 minutes. Then the solution is irradiated at a constant predetermined temperature with a UV immersion lamp in the presence of 0.005 mol/l of benzoin ethyl ether. The monomer content during the course of the polymerization reaction is determined by gas chromatographic analysis, and the attainment of the monomer/polymer equilibrium at a given temperature is indicated by no further decrease in the monomer content of the solution.

By variation of α), β), and γ), molecular weights of about 500–100,000 are reproducibly obtainable, free of chain transfer agent and in a simple manner, whereby by a skillful choice of the parameters, to which the total reaction time is also added, complete conversion of the monomers can also easily be obtained. Thus, for example, a further advantage of the method of the invention is avoidance of the removal of residual monomers (see the Examples). If the recipe is so adjusted that no additional "solvent" is employed other than A), and if A) is completely converted, which is easily possible (see the Examples), all further working up of the batch is obviated.

If recipes are chosen using an inert solvent which can remain in the product, such as PAO (poly-α-olefin) or petroleum oil when the oligomers are used as a component of synthetic base oils, or if the priorly prepared oligomer serves as a solvent for the preparation of further oligomer, then separation of the solvent can also be omitted (Examples 10 and 13).

Thus, the present invention pertains to a method for making homo-oligomers and cooligomers by free radical polymerization of at least one monomer component B) having a high tendency to polymerize and 0–90 percent by weight, preferably 1–50 percent by weight (based on the oligomers) of monomer component A) having a low tendency to polymerize, at elevated temperature in the presence of polymerization initiators in a conventional polymerization vessel, whereby:

a) a liquid phase of monomer component A), or of a solvent, or of both, is present in the polymerization vessel and this is brought to the reaction temperature b) component B), having a high tendency to polymerize, is added in such a manner that the mol ratio of component B) to component A), if component A) is present, passes through values from 0 to about 0.2 in the initial phase of the polymerization and, in the terminal phase of the polymerization, takes the value 0.2 to 20, with the proviso that c) the reaction temperature is so chosen that it lies in a region in which a homopolymer of the better-polymerizing monomer component B) (prepared free of chain transfer agent) already depolymerizes significantly. For determining a "significant depolymerization" it is explained that under these temperature conditions, large amounts of monomer, as a rule 3–80 percent by weight, particularly 10–60 percent by weight, and especially 15–50 percent by weight (based on the sum of monomers plus polymer), are present at monomer-polymer equilibrium, d) the initiator is added over the total duration of the polymerization, whereby the initiator is so chosen that the half-life times range from 1 minute to about 5 hours at the corresponding reaction temperature and the amount of initiator is 0.1 to 10, preferably 1–5, percent by total weight of the monomers.

As a rule, one skilled in the art has sufficient experience, supplemented by literature data (e.g. $K_{growth}/K_{termination}$), to differentiate between monomers having a high tendency to polymerize, B) and such having a low polymerization tendency (monomers A). One possibility for evaluation of respective tendencies to polymerize is, inter alia, the existence of widely-spread Q-values (according to Alfrey-Price, cf. *Polymer Handbook*, Ed. J. Brandrup, E. H. Immergut, 3rd. ed., J. Wiley & Sons, II/267–II/274). Q-values are a measure of the resonance stabilization of a monomer free radical and are determined from certain copolymerization parameters, r. Thus, the copolymerization parameters for the copolymerization of a monomer $M_1$ with a monomer $M_2$ are defined as the quotients of the velocity constants, k, such that $r_1 = k_{111}/k_{112}$ and $r_2 = k_{222}/k_{221}$, where $k_{111} = v_{111}/[M_1 M_1^*][M_1]$ $k_{112} = v_{112}/[M_1 M_1^*][M_2]$ $k_{221} = v_{221}/[M_2 M_2^*][M_1]$ $k_{222} = v_{222}/[M_2 M_2^*][M_2]$ where $v_{111}$, $v_{112}$, $v_{221}$, and $v_{222}$ are the respective reaction velocities for the polymerization steps, determined in a manner known in the art. The Q-values then are determined as $r_1=(Q_1/Q_2) \exp[-e_1(e_1-e_2)]$ $r_2=(Q_2/Q_1) \exp[-e_2(e_2-e_1)]$ where e values are a measure of the size and sign of the electrical charge on the free radical. From this, $Q_2 = RT \ln r_1 + Q_1 - 7.23(10)^{20} e_1(e_1-e_2).$ Unequivocal values for values $Q_2$ and $e_2$ can be defined for a given monomer, $M_2$, using styrene, $M_1$, as a reference for which $Q_1=1$ and $e_1=-0.8$. [For more detailed information see e.g. H.-G. Elias, Makromoleküle p. 540 seq. Hüthig & Wepf, 1971.]

In general, it can be assumed that monomers having higher and lower polymerization tendencies are present if both numerical values of Q are different from one another by a factor equal to or greater than 5. Thus, for example, 1-hexene as monomer component A) has a Q-value of 0.035, while butyl methacrylate, for example, has a Q-value of 0.82.

Preferably, monomer component A), to be used in amounts from 0–90 percent by weight, consists of at least one free radically polymerizable α-olefin having 4–40 carbon atoms, whereby A) usually is 5–90 percent by weight of the cooligomer composition and the remainder is B).

Component B) preferably consists of at least one acrylic- or methacrylic acid ester of the formula (I)

(I)

wherein R stands for hydrogen or methyl and $R_1$ stands for an optionally branched, optionally cyclic alkyl group having 1–42 carbon atoms, in which individual chain members can be replaced by ether groups, —O—, such that there is a distance of at least two carbon chain members between individual ether groups, and in which $R_1$ can additionally be substituted by one or more functional groups Y which contain at least one nitrogen or oxygen atom bound to carbon. Preferably Y stands for a —$NR_2R_3$, —$OR_4$, —$COOR_5$, or

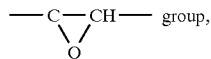 group, wherein $R_2$ and $R_3$ independently mean alkyl having 1 to 4 carbon atoms or wherein $R_2$ and $R_3$, taken together with the nitrogen atom and further optional nitrogen or oxygen atoms, signify a five- or six-membered ring, and wherein $R_4$ and $R_5$ signify hydrogen or an alkyl or cycloalkyl group having 1 to 40, particularly 1–10, carbon atoms.

To the extent cycloalkyl groups are mentioned, they are preferably 5 to 8-membered ring systems.

Further, component B) can contain monomers of the formula II

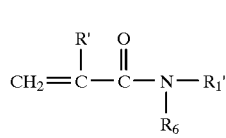

(II)

wherein R' and $R_1'$ have the meaning of R or $R_1$ and $R_6$ stands for hydrogen or has the same meaning as $R_1$.

The method of the invention is particularly preferred for making homo-oligomers formed from monomer component B), particularly from (meth)acrylic acid esters of the formula (I) (see above), and especially from the monomers B') (see below), particularly from B'-α. Further, the method of the invention serves advantageously for the preparation of cooligomers composed of A') 0–75, preferably 10–40, percent by weight of at least one 1-alkene having 4 to 32 carbon atoms, preferably 10 to 14 carbon atoms, in the molecule and B'-α) 20–100, preferably 40 to 90, percent by weight of at least one (meth)acrylic acid ester of the formula I'

(I')

wherein R' stands for hydrogen or methyl and $R_1''$ for an optionally branched alkyl group or a cycloalkyl group having 4 to 32 carbon atoms, preferably 8 to 20 carbon atoms, in the alkyl portion, as well as B'-β) 0–65, preferably 0.5 to 50, particularly 3–40, percent by weight of a (meth)acrylic acid ester of the formula I''

(I'')

wherein R' stands for hydrogen or methyl and $R_1'''$ stands for an alkyl group having 2 to 6 carbon atoms substituted with at least one group Y', wherein Y' has the same meaning as Y, in particular an alkyl group having 2 to 6 carbon atoms substituted with an hydroxy group, or for a group

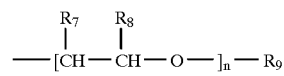

wherein $R_7$ and $R_8$ are hydrogen or methyl, $R_9$ is hydrogen or an optionally branched alkyl group having 1 to 40, preferably 1 to 20, carbon atoms, and n is a whole number from 1 to 60, with the proviso that if n is 1, then $R_8$ exclusively stands for an optionally branched alkyl group having 1 to 40 carbon atoms.

As a rule, here too the components A') and B') of the cooligomers add up to 100 percent by weight.

As examples of monomer component A), the following are representative: butene-1, pentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, heneicosene-1, docosene-1, trocosene-1, tetracosene-1, pentacosene-1, hexacosene-1, heptacosene-1, octacosene-1, nonacosene-1, triacontene-1, hentriacontene-1, dotriacontene-1, or the like. Branched alkenes, for example vinylcyclohexane, 3,3-dimethylbutene-1, 3-methylbutene-1, diisobutylene-4-methylpentene-1 or the like are also suitable.

Also, alkene-1 compounds having 10 to 32 carbon atoms such as are obtained by the polymerization of ethylene, propylene, or mixtures thereof, are suitable, the starting materials in turn being obtained from hydrocracked materials.

That variant in which component A) of the cooligomer stands for decene-1 or for dodecene or tetradecene is particularly preferred.

Further oligomers or cooligomers are of particular interest wherein component B) consists of (meth)acrylic acid esters having 4–22 carbon atoms in the (branched or linear) alkyl portion or of mixtures of these materials.

For example, the following monomers are named: butyl acrylate, 2-ethylhexyl acrylate, cyclohexyl acrylate, isodecyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, cetylstearyl acrylate, oleyl acrylate, nonadecyl acrylate, eicosyl acrylate, cetyleicosyl acrylate, stearyleicosyl acrylate, docosyl acrylate, eicosyltetratriacontyl acrylate, or the corresponding methacrylates.

Alkyl methacrylates have 10 or more carbon atoms in the alkyl portion having a high iso-fraction are preferred. For example, C12–C15-alkyl esters of methacrylic acid having ca. 60–90% iso-fraction, as well as isodecyl methacrylate, are preferred.

For particular end uses, monomers according to formula I, wherein $R_1$ stands for C1–C3-alkyl, particularly methyl methacrylate or also ethyl acrylate, ethyl methacrylate, propyl acrylate, and propyl methacrylate, are suitable, whereby, however, the low boiling points for the reaction at normal pressure have a limiting effect.

As representatives of the monomer group B) according to formula (I), the following amine-substituted alkyl esters of (meth)acrylic acid are further mentioned: 2-diaminomethyl (meth)acrylate, 2-diethylaminoethyl (meth)acrylate, 2-dimethylaminoethyl (meth)acrylate, 3-dimethylamino-2,2-dimethylpropyl-1 (meth)acrylate, 2-morpholinoethyl (meth)acrylate, 2-tert.-butylaminoethyl (meth)acrylate, 3-(dimethylamino)propyl (meth)acrylate, 2-(dimethylaminoethoxyethyl) (meth)acrylate.

The following oxy- or alkoxy-substituted alkyl esters of (meth)acrylic acid are further mentioned: 2-hydroxyethyl (meth)acrylate, 2-hydroxypropyl (meth)acrylate, 2-methoxyethyl (meth)acrylate, 2-ethoxyethyl (meth)acrylate, 2-butoxyethyl (meth)acrylate, 2-(2-butoxyethoxy)ethyl (meth)acrylate, 2-(ethoxyethyloxy)ethyl (meth)acrylate, 4-hydroxybutyl (meth)acrylate, 2-[2-(2-ethoxyethoxy)ethoxy]ethyl (meth)acrylate, 3-methoxybutyl-1-(meth)acrylate, 2-alkoxy-methylethyl (meth)acrylate, and 2-hexoxyethyl (meth)acrylate.

The following (meth)acrylamides are mentioned as representatives of monomer group B) according to formula II: N-methyl (meth)acrylamide, N-dimethylamino (meth)acrylamide, N-dimethylaminopropyl (meth)acrylamide, N-isopropyl (meth)acrylamide, N-tert butyl (meth)acrylamide, N-isobutylmethyl (meth)acrylamide, N-decyl (meth)acrylamide, N-cyclohexyl (meth)acrylamide, N-[3-(dimethylamino)-2,2-dimethylpropyl] methacrylamide, N-dodecyl (meth)acrylamide, N-[(3-dimethylamino)propyl] (meth)acrylamide, and N-(2-hydroxyethyl) (meth)acrylamide.

In general, the boiling point is above the chosen reaction temperature, in order to avoid pressurized reactions. Such solvents are known in the art.

Preparation of the Cooligomers

As already discussed, it is already known in the art to prepare oligomers or cooligomers under specified conditions from the two monomer classes by free radical polymerization, for example by thermal polymerization and with addition of a suitable initiator or redox system (compare State of the Art) The method of the invention can serve for making both new cooligomers as well as cooligomers having the comonomer composition of known cooligomers. The method of the invention is characterized by a greater breadth of use and very good results, but predicates the maintenance of certain method conditions. In the method, the monomer component A) having a slight polymerization tendency and/or the solvent are heated to the reaction temperature in a suitable polymerization vessel equipped with a thermometer, heating means, and stirring means. The solvent should be stable and inert under the reaction conditions. Suitably, the boiling point of the solvent is above the chosen reaction temperature. As examples, aliphatic or aromatic hydrocarbons such as xylene, cymene, decane, or dodecane are mentioned, or also petroleum oils, poly-α-olefins, esters, as well as previously prepared oligomers, are suitable as solvents.

Especially suitable is the use of petroleum oils, or of other synthetic oil liquids not based on petroleum oils if the cooligomers are to be used as a base liquid for synthetic oils (cf. Ullmann's Encyclopädie der technischen Chemie, 4th ed., vol. 20, pp. 484–530, Verlag Chemie 1981), particularly of the types which later are to serve as components of mixtures. In this connection are mentioned: poly-α-olefins of differing viscosity classes, hydrocrack oils, various ester oils such as TMA-OD-ester (the ester of trimethylolpropane with adipic acid), as well as commercial petroleum oils, e.g. of the 100N or 150N classes.

The reaction temperature is, according to criterion c) so chosen that it is within a region in which a homopolymer (prepared without a chain transfer agent) of the better polymerizing monomer component B) is already noticeably depolymerized. A "noticeable depolymerization" is as a rule then present if in the (thermally determined) monomer/polymer-equilibrium there are already larger amounts of monomer present. 3–80 percent by weight of monomer in the equilibrium are given as a measure.

In any event, the determination of the polymerization-equilibrium requires some effort. Also, there are no present literature data for a number of monomer or temperature regions.

For a crude but practical evaluation—useful for predictions—of this temperature region of the invention, the very simple method of thermogravimetry has proved useful. In this method, a conventionally prepared homopolymer of the better polymerizing component B) is investigated thermogravimetrically at increasing temperature with exclusion of oxygen. The temperature region that begins 50 Centigrade degrees below the first losses in weight due to depolymerization, and which ends about 30 Centigrade degrees above this temperature, should be considered for the first oligomerization trials.

Further, the choice and the manner of addition of the free radical initiators is of importance according to the invention: The initiators should be so chosen that their half-life times at the respective reaction temperature lie in the region from about 1 minute to about 5 hours. (Cf. Kirk-Othmer, loc.cit., 3rd. ed., vol. 13, pp. 355–373, Interscience 1981; Brandrup-Immergut, Polymer Handbook, loc. cit. II/1).

The addition of the initiators occurs over the whole duration of the polymerization (with exception of the post-polymerization, mostly in a region from ½–1 hour). Usually the reaction duration is in the range from about 10 and up to 15 hours, for example around 12±1 hours. Of this as a rule about ⅒ up to one half, for example 1–5.5 hours, belongs to the phase of monomer addition. The addition of the initiators over the entire course of the reaction is suitably carried out either portion-wise at suitable intervals, for example half-hourly, or continuously, e.g. in the manner of a feed. As a guide, the addition of 0.001–0.005 mol portions, per mol of the monomers A) or B), at half-hour intervals, should serve. The amount of initiator is so measured that in total it is 0.1 to about 10 percent by total weight of the monomers.

As initiators, peroxidic initiators, for example, are useful to the extent that they meet the aforementioned criteria. Di-tert.-butyl peroxide, tert.-butyl perbenzoate, or tert.-butyl peroctoate, are mentioned, to name only a few examples.

According to results at hand, an extensive conversion of the monomers, for example around 98%, can be achieved according to the invention by a suitable selection of the reaction conditions, so that in many cases a separation of the monomers, indeed even any further working up, is obviated. In the usual cases, the residual monomer is almost exclusively component A) which can be separated depending on the end use. The products are generally colorless oily liquids which mix completely with petroleum oils, PAO, hydrocracked oils, and ester oils if the content of B'-β does not exceed certain limits, e.g. about 50 percent by weight.

Advantageous Properties

The cooligomers according to the present invention can—as already described in the State of the Art—be used commercially in various fields. The are suitable, for example, as valuable components of synthetic oils. To the extent they have functional groups (for example according to criterion B'-β), they impart a dispersing action to the synthetic oils. In addition, they serve as low molecular weight additives to petroleum oils, whereby again those having dispersing properties are of particular interest. Further, they can find use as plasticizers for certain synthetic resins. Advantages are inter alia slight migration and no determinable toxicity. By the use of polar/nonpolar monomers, a very desirable breadth of utility can be achieved.

The following Examples are given by way of illustration.

In them, the physical data were determined according to the following standards:

| | |
|---|---|
| Viscosity: | $\eta$ (100° C.) (according to DIN 51 562 or ASTM D445 in an Ubbelohde capillary viscosimeter) |
| | : VI calculated from the 40 and 100° C. viscosity of the base oil |
| Pour point: | in a pour point apparatus according to DIN 51 583 |
| Molecular weight: | by gel chromatography against PMMA as a standard |
| Inhomogeneity: | $U = \overline{M}_w/\overline{M}_n - 1$ |
| Noacknumber: | according DIN 51 581. |

The abbreviation "AMA" stands for alkyl methacrylate, "PAO" stands for poly-α-olefin, "TMA-OD-Ester" stands for the ester of trimethylolpropane with adipic acid.

EXAMPLES

Examples of the Method

Example 1

1 mol of decene-1 (140 g) is heated to 160° C. in a reaction vessel. A mixture of 0.5 mol of isodecyl methacrylate (113 g) and 0.5 mol of C12–C15-alkyl methacrylate having a 60% iso-fraction (136 g) is now fed in over 4 hours. At the end of the feed, the batch is polymerized for another 12 hours. During the entire reaction time of 16 hours, with the exception of the last hour, di-tert.-butyl peroxide is added at 30-minute intervals (here, 30 portions, total amount 2.8 wt. % based on the monomers).

At the end of the reaction, the conversion of the monomers was about 98%.

The product is a colorless oily liquid which is completely miscible with petroleum oils, polyolefins, or ester oils.

| Material data: | |
|---|---|
| $\eta$ (100° C.) = | 45.1 mm²/s |
| $\eta$ (40° C.) = | 489.0 mm²/s |
| VI = | 146 |
| Pour point = | −43.2° C. |
| $\overline{M}_w$ = | 4000 |
| $\overline{M}_n$ = | 1790 |
| U = | 1.23 |
| Evaporation loss (Noack) | 4–5 wt. % |

Example 2

Performed as in Example 1, except feed of the methacrylate mixture over 1.5 hours.

| Material data: | |
|---|---|
| $\eta$ (100° C.) = | 94.9 mm²/s |
| $\eta$ (40° C.) = | 1210.8 mm²/s |
| VI = | 164 |
| Pour point = | −33.6° C. |
| $\overline{M}_w$ = | 8330 |
| $\overline{M}_n$ = | 2280 |
| U = | 2.65 |
| Monomer conversion | 95% |

Example 3

As in Example 1, but the reaction temperature is 140° C. and the initiator is tert.-butyl perbenzoate.

| Material data: | |
|---|---|
| $\eta$ (100° C.) = | 87.8 mm²/s |
| $\eta$ (40 C.) = | 1888.3 mm²/s |
| VI = | 154 |
| Pour point = | −34.7° C. |
| $\overline{M}_w$ = | 6890 |
| $\overline{M}_n$ = | 2240 |
| U = | 2.00 |
| Monomer conversion | 97% |

Example 4

2 mols of decene-1 (280 g) are heated to 160° C. in a reaction vessel. 1 mol of isodecyl methacrylate (227 g) is fed in at this temperature over 5 hours. At the end of the feed, the batch was further polymerized for another 6 hours. During the entire reaction time of 11 hours, with the exception of the last hour, di-tert.-butyl peroxide as an initiator is added at 30-minute intervals (here, 20 portions totalling 4.3 wt. % based on the monomers).

At the end of the reaction the conversion of the monomers was ca. 92%.

Material data:

| | |
|---|---|
| η (100° C.) = | 25.9 mm²/s |
| η (40° C.) = | 250.3 mm²/s |
| VI = | 134 |
| Pour point = | −48.4° C. |
| $\overline{M}_w$ = | 2240 |
| $\overline{M}_n$ = | 1370 |
| U = | 0.64 |

Example 5

As in Example 4, but isodecyl methacrylate/decene 1:1 mol. Total amount of initiator=2.8 wt. %

Material data:

| | |
|---|---|
| η (100° C.) = | 47.6 mm²/s |
| η (40° C.) = | 603.8 mm²/s |
| VI = | 132 |
| Pour point = | −38.9° C. |
| $\overline{M}_w$ = | 3120 |
| $\overline{M}_n$ = | 1610 |
| U = | 0.94 |

Example 6

As in Example 4, but isodecyl methacrylate: decene in a mol ratio of 1:0.25. Total amount of initiator=2.8 wt. %.

Material Data:

| | |
|---|---|
| η (100° C.) = | 424.6 mm²/s |
| η (40° C.) = | 1219.7 mm²/s |
| VI = | 170 |
| Pour point = | −10.7° C. |
| $\overline{M}_w$ = | 12300 |
| $\overline{M}_n$ = | 2890 |
| U = | 3.26 |
| Monomer conversion | 98% |

Example 7

As in Example 6, but feed of the isodecyl methacrylate over 2.5 hours. Total amount of initiator=2.8 wt. %.

Material Data:

| | |
|---|---|
| η (100° C.) = | 888.2 mm²/s |
| η (40° C.) = | 27162 mm²/s |
| VI = | 206 |
| Pour point = | (too viscous) |
| $\overline{M}_w$ = | 24800 |
| $\overline{M}_n$ = | 3480 |
| U = | 6.12 |
| Monomer > conversion | 99% |

Example 8

As in Example 5, but reaction temperature is 140° C. Initiator: tert.-butyl perbenzoate, 4.8 wt. %.

Material Data:

| | |
|---|---|
| η (100° C.) = | 130.7 mm²/s |
| η (40° C.) = | 2335.1 mm²/s |
| VI = | 147 |
| Pour point = | −25.9° C. |
| $\overline{M}_w$ = | 6690 |
| $\overline{M}_n$ = | 2200 |
| U = | 2.04 |
| Monomer conversion | 96% |

Example 9

As in Example 5, but reaction temperature is 126° C. Initiator: tert.-butyl pernonoate, 4.8 wt. %.

Material Data:

| | |
|---|---|
| η (100° C.) = | 460.1 mm²/s |
| η (40° C.) = | 12321.7 mm²/s |
| VI = | 180 |
| Pour point = | −8.5° C. |
| $\overline{M}_w$ = | 11800 |
| $\overline{M}_n$ = | 2560 |
| U = | 2.31 |
| Monomer conversion | 88% |

Example 10

Performed as in Example 4, but 280 g of the synthetic oil prepared according to Example 4 is used as a solvent in addition to 1 mol of decene-1.

Material Data:

| | |
|---|---|
| η (100° C.) = | 28.0 mm²/s |
| η (40° C.) = | 294.0 mm²/s |
| VI = | 127 |
| Pour point = | −44.5° C. |
| $\overline{M}_w$ = | 2180 |
| $\overline{M}_n$ = | 1350 |
| U = | 0.61 |
| Monomer conversion | 98% |

Example 11

As in Example 1, but the methacrylate components is butyl methacrylate. Feed time is 3.5 hours.

Material Data:

| | |
|---|---|
| η (100° C.) = | 1480 mm²/s |
| η (40° C.) = | 2836.2 mm²/s |
| VI = | 147 |
| Pour point = | −26° C. |
| $\overline{M}_w$ = | 6500 |
| $\overline{M}_n$ = | 1860 |
| U = | 2.51 |
| Monomer conversion | 91% |

Example 12

3 mols of dodecane (532 g) are heated to 160° C. in a reaction vessel. 1 mol of C12–C15-alkyl methacrylate having a 90% iso-fraction (272 g) is fed in over 5.5 hours. At the end of the feed, the batch is further polymerized for 11 hours. Addition of initiator is as described in Example 1. After the reaction, the solvent is removed by distillation. The product obtained is a colorless oily liquid which is completely miscible with petroleum oils, PAO, or ester oils.

Material data:

| | |
|---|---|
| $\eta$ (100° C.) = | 16.7 mm$^2$/s |
| $\eta$ (40° C.) = | 128.1 mm$^2$/s |
| VI = | 141 |
| Pour point < | −52.1° C. |
| $\overline{M}_w$ = | 1510 |
| $\overline{M}_n$ = | 1230 |
| U = | 0.23 |
| Evaporation = loss (Noack) | 6% |
| Monomer = conversion | 95% |

Example 13

As in Example 12, but using the same amount by weight of hydrocrack oil instead of dodecane as solvent.

Material data for hydrocrack oil:

| | |
|---|---|
| $\eta$ (100° C.) = | 3.62 mm$^2$/s |
| VI = | 126 |
| Pour point = | −33.0° C. |

Material data for the oligomer/oil mixture obtained:

| | |
|---|---|
| $\eta$ (100° C.) = | 5.08 mm$^2$/s |
| $\eta$ (40° C.) = | 24.1 mm$^2$/s |
| VI = | 144 |
| Pour point = | −34.5° C. |

Example 14

400 g (0.28 mol) of C1* are dissolved in 450 g (1.99 mols) of isodecyl methacrylate. 250 g (1.78 mols) of decene-1 are heated to 140° C. in a reaction vessel. Over 1.5 hours, the methacrylate mixture is fed in. At the end of the feed, the batch is further polymerized for 15 hours. Initiator addition is as described in Example 1. The initiator is tert.-butyl perbenzoate, total amount about 3 wt. %. The product obtained is a yellowish oil which is soluble in petroleum oil.

*C1 is the methacrylic acid ester of an ethoxylated C16–C18-fatty alcohol mixture, average degree of ethoxylation 25. Here, the alcohol "Marlipal 1618/25", a product of Hüls AG, is used.

Material data:

| | |
|---|---|
| $\eta$ (100° C.) = | 1006 mm$^2$/s |
| $\eta$ (40° C.) = | 15756 mm$^2$/s |
| VI = | 276 |
| Pour point = | (too viscous) |
| $\overline{M}_w$, $\overline{M}_n$ = | (not determinable by gel permeation chromatography because of strong adsorption) |
| Monomer = conversion | 98% |

Example 15

300 g (0.37 mol) of component C2** is dissolved in 400 g (1.77 mols) of isodecylmethacrylate. 300 g (2.14 mols) of decene-1 are heating to 160° C. in a reaction vessel. The methacrylate mixture is fed in over 2 hours. The total reaction time is 16.5 hours. Initiator addition as in Example 1. Initiator: di-tert.-butyl peroxide, total amount about 3 wt. %. The product is soluble in petroleum oil.

**C2 is the methacrylic acid ester of methoxypolyethylene glycol, average degree of ethoxylation 16. Here, the alcohol "Carbowax 75" of Union Carbide is used.

Material data:

| | |
|---|---|
| $\eta$ (100° C.) = | 293.4 mm$^2$/s |
| $\eta$ (40° C.) = | 3999.0 mm$^2$/s |
| VI = | 217 |
| Pour point = | −22.1° C. |
| $\overline{M}_w$, $\overline{M}_n$ | (not determinable by gel permeation chromatography because of strong adsorption) |
| Monomer conversion | nearly 100% |

Example 16

As in Example 5, but using C12–C15-alkylmethacrylate having a 90% iso-fraction instead of isodecyl methacrylate.

Material Data:

| | |
|---|---|
| $\eta$ (100° C.) = | 41.8 mm$^2$/s |
| $\eta$ (40° C.) = | 417.6 mm$^2$/s |
| VI = | 152 |
| Pour point = | −44.1° C. |
| $\overline{M}_w$ – | 3430 |
| $\overline{M}_n$ – | 1830 |
| U = | 0.78 |

Example 17

As in Example 1, but the methacrylate component is C12–C15-alkyl methacrylate (90% iso). AMA: decene mol ratio=1:0.5. Feed of AMA over 1 hour.

Material Data:

| | |
|---|---|
| $\eta$ (100° C.) = | 234.4 mm$^2$/s |
| $\eta$ (40° C.) = | 4810.6 mm$^2$/s |
| VI = | 165 |
| Pour point = | −25.6° C. |
| $\overline{M}_w$ = | 23100 |
| $\overline{M}_n$ = | 3230 |
| U = | 6.14 |

Examples of Applied Technology

Example 18

Comparison of viscosity data for an oligomer/ester oil mixture with a poly-α-olefin/ester oil mixture.

| | 20% PAO 100 in | 20% oligomer from TMA-OD ester | Example 17 in TMA-OD ester |
|---|---|---|---|
| $\eta$ (100° C.) | | 6.68 mm$^2$/s | 7.70 mm$^2$/s |
| VI | | 193 | 212 |
| CCS (−30° C.)* | | 1800 mPa s | 1600 mPa s |

*CCS=Cold Cranking Simulator, a method for determining viscosities at low temperatures and at relative high shear rates according to AMST D 2606.

It is clearly recognizable that with the cooligomer in the mixture a lower viscosity at −30° C., and thus a better low temperature behavior, is attainable, despite a higher viscosity at 100° C.

Example 19

Comparison of an oligomer/PAO formulation with a PAO6/PAO40 formulation in the VW-TD motor test.*

*VW–TD=Volkswagen Turbo Diesel Engine Test according to CEC L35-T84.

|  | PAO40 in PAO6 | Oligomer from Example 18 in PAO6 |
|---|---|---|
| Formulation | 45% PAO40 | 45% oligomer |
|  | 14.2% commercial DI package | 14.2% commercial DI package |
|  | 40.8% PAO6 | 40.8% PAO6 |
| η (100° C.) | 19.5 mm²/s | 18.7 mm²/s |
| VI | 147 | 148 |
| SAE-class | 10W-50 | 10W-50 |
| VW-TD result | 63.7 points, all rings free | 67.2 points, all rings free |

With the oligomer/PAO mixture, an outstanding Diesel evaluation can be achieved, which indicates very good thermal-oxidative stability. It is further to be noted that the pure poly-α-olefin formulation used for comparison exhibits very good Diesel performance, as is known.

Example 20

1 mol of 1-decene (140 g) is heated to 160° C. in a reaction vessel. 0.67 mol of isodecyl acrylate (140 g) are fed in over 2 hours. At the end of the feed, the batch is further polymerized for 14 hours. During the entire reaction period of 16 hous with the exception of the last hour, di-tert.-butyl peroxide is added continuously (total amount 8.4 g, which is 3 wt. % based on the monomers) The reaction product is an oily liquid, which is miscible with mineral oil, poly/olefins or ester oils.

| Material data: |  |
|---|---|
| n (100° C.) = | 61.6 mm²/s |
| n (40° C.) = | 663.7 mm²/s |
| VI = | 161 |
| Pour point = | −45.8° C. |
| $M_w$ = | 5120 |
| $M_n$ = | 2520 |
| U = | 1.03 |
| Monomer conversion = | about 93% |

Example 21

1 mol of 1-decene (140 g) is heated to 140° C. in a reaction vessel. A mixture of 1.2 mol of isodecyl methacrylate (271 g) and of 0.3 mol of 2-dimethyl aminoethylmethacrylate is fed in over 5 hours. At the end of the feed the batch is further polymerized for 11 hours. During the entire reaction period of 16 hours with the exception of the last hour tert.butyl perbenzoate is added continuously (total amount 18.3 g, which is 4 wt. % based on the monomers) The reaction product is a brownish oily liquid. Monomer conversion at the end of the reaction is 85%. The residual amount of unreacted monomer (15%) is 1-decene exclusively.

| Material data: |  |
|---|---|
| $M_w$ = | 12300 |
| $M_n$ = | 2970 |
| U = | 3.15 |

What is claimed is:

1. A method for making an oligomer which comprises free-radically polymerizing B) at least one (meth)acrylic acid ester monomer component having 1 to 42 carbon atoms of formula (I):

(I)

wherein R stands for hydrogen or methyl and $R_1$ stands for an optionally branched, optionally cyclic alkyl group having 1–42 carbon atoms, in which individual chain members can be replaced by ether groups, —O—, such that there is a distance of at least two carbon chain members between individual ether groups, and in which $R_1$ can additionally be substituted by one or more functional groups Y which contain at least one nitrogen or oxygen atom bound to carbon, and A) 0–90 percent, by weight of the oligomer, of an α-olefin monomer component having 4–40 carbon atoms, at an elevated reaction temperature and in the presence of a polymerization initiator, comprising 1) bringing a liquid phase of monomer component A), or of a solvent, or of both, present in a polymerization vessel to reaction temperature, in the absence of the polymerization initiator;

2) subsequently adding monomer component B) to the vessel over a period of time;

3) adding a polymerization initiator having a half-life from 1 minute to about 5 hours at the reaction temperature to the vessel during said period of time to initiate polymerization and continuing to add said polymerization initiator during the time of polymerization, which time exceeds said period of time for addition of monomer B), wherein the total amount of polymerization initiator is from 0.1 to 10 percent by total weight of the monomers.

2. The method as in claim 1 wherein said oligomer is a cooligomer.

3. The method of claim 1, wherein component B) additionally contains monomers of formula (II)

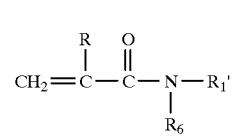

(II)

wherein R stands for hydrogen or methyl, and $R_1'$ has the meaning of R or $R_1$, and $R_6$ stands for hydrogen or has the same meaning as $R_1$.

4. The method of claim 1, wherein component A) is 0–75 percent by weight of the oligomer of at least one 1-alkene having 4 to 32 carbon atoms, and component B) is B'-α) 20–100 percent by weight of the oligomer of at least one (meth)acrylic acid ester of the formula I'

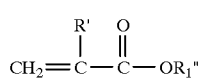

(I')

wherein R' stands for hydrogen or methyl, and $R_1''$ stands for an optionally branched alkyl group or a cycloalkyl group having 4 to 32 carbon atoms in the alkyl portion, and B'-β) 0–65 percent by weight of the oligomer of a (meth)acrylic acid ester of the formula I'''

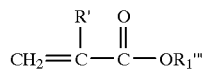

(I'')

wherein R' stands for hydrogen or methyl and $R_1'''$ stands for an alkyl group having 2 to 6 carbon atoms substituted with at least one group Y', wherein Y' is a functional group which contain at least one nitrogen or oxygen atom bound to carbon, or for a group

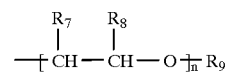

wherein $R_7$ and $R_8$ are hydrogen or methyl, $R_9$ is hydrogen or an optionally branched alkyl group having 1 to 40 carbon atoms, and n is a whole number from 1 to 60, with the proviso that if n is 1, then $R_8$ exclusively stands for an optionally branched alkyl group having 1 to 40 carbon atoms.

5. The method of claim 1, wherein said period of time for addition of monomer B) is about $\frac{1}{10}$ up to $\frac{1}{2}$ of the entire time of polymerization.

6. The method of claim 5, wherein the polymerization initiator is added either portion-wise or continuously.

7. The method of claim 1, comprising additionally carrying out a post-polymerization in the absence of added polymerization initiator.

* * * * *